(12) United States Patent
Li et al.

(10) Patent No.: US 12,216,958 B2
(45) Date of Patent: Feb. 4, 2025

(54) INFORMATION PROCESSING METHOD AND ELECTRONIC DEVICE

(71) Applicant: Lenovo (Beijing) Limited, Beijing (CN)

(72) Inventors: Jing Li, Beijing (CN); Liang Zhang, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/941,227

(22) Filed: Sep. 9, 2022

(65) Prior Publication Data
US 2023/0195403 A1      Jun. 22, 2023

(30) Foreign Application Priority Data

Dec. 20, 2021   (CN) .......................... 202111566379.9

(51) Int. Cl.
*G06F 3/14*          (2006.01)
*G06F 3/01*          (2006.01)
(52) U.S. Cl.
CPC ............ *G06F 3/1454* (2013.01); *G06F 3/011* (2013.01)
(58) Field of Classification Search
CPC .... A63F 13/52; A63F 2300/308; G06F 3/011; G06F 3/1454; H04L 12/1813; H04L 12/1818; H04L 12/185; G09G 2354/00; G09G 2370/04; G09G 2370/042; G09G 2370/045
See application file for complete search history.

(56) References Cited

U.S. PATENT DOCUMENTS

| 11,360,634 | B1* | 6/2022 | Chang | G06F 3/1454 |
| 2015/0128067 | A1* | 5/2015 | Wong | G06F 3/017 |
| | | | | 709/217 |
| 2022/0335911 | A1* | 10/2022 | Zhao | G09G 5/373 |
| 2022/0408136 | A1* | 12/2022 | Wang | H04N 21/439 |
| 2023/0091539 | A1* | 3/2023 | Lan | H04L 65/1069 |
| | | | | 348/14.09 |

FOREIGN PATENT DOCUMENTS

CN       113329201 A     8/2021

* cited by examiner

*Primary Examiner* — Nelson M Rosario
(74) *Attorney, Agent, or Firm* — ANOVA LAW GROUP, PLLC

(57) ABSTRACT

An information processing method includes obtaining parameter information, in response to an electronic device being in a sharing scenario, displaying, based on the parameter information, a sharing identifier for sharing the source device, and in response to obtaining an input operation for the sharing identifier, sending display data of the source device obtained through a first connection channel to a server of the sharing scenario based on a second connection channel, to achieve real-time sharing of the display data of the source device by at least one sharing object in the sharing scenario. The parameter information is configured to characterize a connected source device. The source device is capable of processing and displaying information. The display data of the source device includes dynamically changing data generated by the source device for display.

19 Claims, 2 Drawing Sheets

INFORMATION PROCESSING METHOD AND ELECTRONIC DEVICE

CROSS-REFERENCE TO RELATED APPLICATION

The present application claims priority to Chinese Patent Application No. 202111566379.9, filed Dec. 20, 2021, the entire content of which is incorporated herein by reference.

TECHNICAL FIELD

The present disclosure relates to the field of communication technology and, in particular, to an information processing method and electronic device.

BACKGROUND

With rapid development of science and technology, application of electronic devices is becoming more and more popular. Both functions of the electronic devices and application scenarios of the electronic devices are becoming more and more abundant. Nowadays, an electronic device can make a call between at least two users to implement a multi-party remote conference or chat.

However, if a user of the at least two user needs to share some content of other devices to other call parties during the multi-party remote conference, the user needs to perform a series of operations including turning on a camera of the user's electronic device to obtain display content of a third-party device, to send the display content of the third-party device to the other call parties. The sharing operation during the sharing process is complicated, and the quality of the shared display content is poor.

SUMMARY

In accordance with the disclosure, there is provided an information processing method including obtaining parameter information, in response to an electronic device being in a sharing scenario, displaying, based on the parameter information, a sharing identifier for sharing the source device, and in response to obtaining an input operation for the sharing identifier, sending display data of the source device obtained through a first connection channel to a server of the sharing scenario based on a second connection channel, to achieve real-time sharing of the display data of the source device by at least one sharing object in the sharing scenario. The parameter information is configured to characterize a connected source device. The source device is capable of processing and displaying information. The display data of the source device includes dynamically changing data generated by the source device for display.

Also in accordance with the disclosure, there is provided an electronic device including a display screen, and a processor configured to obtain parameter information, in response to an electronic device being in a sharing scenario, display, based on the parameter information, a sharing identifier for sharing the source device, and in response to obtaining an input operation for the sharing identifier, send display data of the source device obtained through a first connection channel to a server of the sharing scenario based on a second connection channel, to achieve real-time sharing of the display data of the source device by at least one sharing object in the sharing scenario. The parameter information is configured to characterize a connected source device. The source device is capable of processing and displaying information. The display data of the source device includes dynamically changing data generated by the source device for display.

Also in accordance with the disclosure, there is provided a non-transitory computer-readable storage medium storing computer instructions that, when executed by a processor, causing the processor to perform obtaining parameter information, in response to an electronic device being in a sharing scenario, displaying, based on the parameter information, a sharing identifier for sharing the source device, and in response to obtaining an input operation for the sharing identifier, sending display data of the source device obtained through a first connection channel to a server of the sharing scenario based on a second connection channel, to achieve real-time sharing of the display data of the source device by at least one sharing object in the sharing scenario. The parameter information is configured to characterize a connected source device. The source device is capable of processing and displaying information. The display data of the source device includes dynamically changing data generated by the source device for display.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
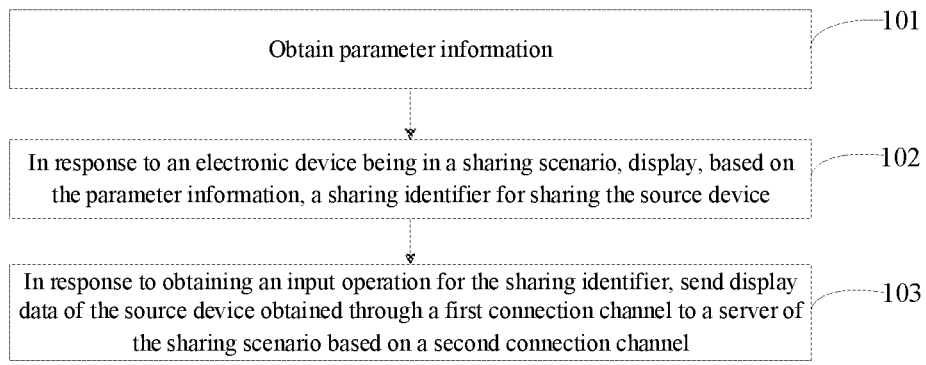
FIG. 1 is a schematic flow chart of an information processing method consistent with the embodiments of the disclosure.

FIG. 1 is a schematic flow chart of an information processing method consistent with the embodiments of the disclosure. The information processing method is applied to an electronic device. As shown in FIG. 1, the information processing method includes the following processes. At 101, parameter information is obtained.

The parameter information is configured to characterize a connected source device. The source device is capable of processing and displaying information.

In an example embodiment, the electronic device may be a device having a function of communication with other devices and a display screen, for example, a smart mobile terminal, or a computer in one of various forms. The electronic device may detect whether the electronic device is currently communication connected to a source device. In response to the electronic device establishing a communication connection with the source device, the electronic device can obtain the parameter information indicating that the electronic device has been connected to the source device. The source device may be a device with processing capability and display capability, for example, a smart mobile terminal or a computer.

At 102, in response to the electronic device being in a sharing scenario, based on the parameter information, a sharing identifier for sharing the source device is displayed.

In an example embodiment, whether the electronic device and the source device are in a sharing scenario of sharing information is detected. In response to detecting that the electronic device and the source device being in the sharing scenario, the electronic device generates a sharing identifier of the display data of the source device based on the obtained parameter information, and displays the sharing identifier on the display screen of the electronic device, to enable a user to perform operation on the sharing identifier when the user needs to sharing with the source device.

At 103, in response to obtaining an input operation for the sharing identifier, display data of the source device obtained through a first connection channel is sent to a server of the sharing scenario based on a second connection channel.

In response to the input operation for the sharing identifier being obtained, the display data of the source device obtained through the first connection channel is sent to the server of the sharing scenario based on the second connection channel, to achieve real-time sharing of the display data of the source device by at least one sharing object in the sharing scenario. The display data of the source device includes dynamically changing data generated by the source device for display. The at least one sharing object may include one or more devices used by another one or more users in the sharing scenario, or one or more devices used by another one or more users in a multi-party remote conference.

In some embodiments, the input operation may be obtained by a touch operation performed by the user on an area where the sharing identifier is located on the display screen. The input operation is used to indicate that the display data of the source device is shared to the server. The first data connection channel is a communication channel for data transmission between the electronic device and the source device. The second data connection channel is a communication channel for data transmission between the electronic device and the server. The server may include an electronic device connected to the electronic device using an application program for communication, or a server that provides application services. The display data of the source device is the data generated by the source device for display, which refers to the data that can be directly displayed on the display screen of the source device.

When the electronic device detects an input operation for the sharing identifier, the electronic device sends the obtained display data of the source device to the corresponding server in the sharing scenario based on the second connection channel. The display data of the source device obtained by the electronic device may include data actively sent by the source device to the electronic device through the first connection channel, or data obtained by the electronic device through a corresponding request from the source device.

The information processing method consistent with the embodiments of the present disclosure is provided. The parameter information is obtained. In response to an electronic device being in a sharing scenario, based on the parameter information, a sharing identifier for sharing the source device is displayed. In response to obtaining an input operation for the sharing identifier, display data of the source device obtained through a first connection channel is sent to a server of the sharing scenario based on a second connection channel. In this way, when the parameter information configured to characterize a connected source device is obtained, if the electronic device is in the sharing scenario, the sharing identifier used for the sharing source device is displayed based on the parameter information. The display data of the source device obtained through the first connection channel is sent to the server of the sharing scenario based on the second connection channel, to realize the sharing of the display data sent by the source device to the server of the sharing scenario, which solves the problem that when the current electronic device shares the content of the third-party device during the call, the sharing operation process is relatively complicated and the quality of the shared content is poor. The information processing method consistent with the embodiments of the present disclosure is a method for sharing the content of a third-party device during a call, which simplifies the sharing operation process and effectively ensures the quality of the shared content.

Figure 2:
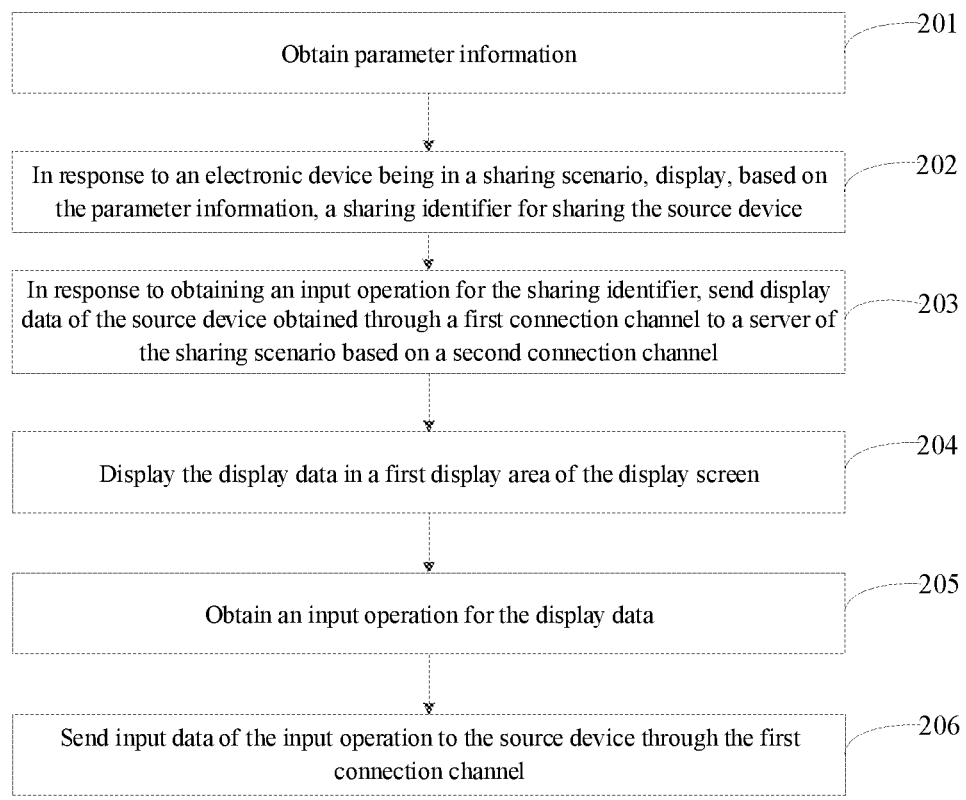
FIG. 2 is a schematic flow chart of another information processing method consistent with the embodiments of the disclosure.

FIG. 2 is a schematic flow chart of another information processing method consistent with the embodiments of the disclosure. The information processing method is applied to an electronic device. As shown in FIG. 2, the information processing method includes the following processes.

At 201, parameter information is obtained.

The parameter information is configured to characterize a connected source device. The source device is capable of processing and displaying information.

In an example embodiment, the electronic device is a smartphone, and the source device is a laptop computer. When a communication connection between the smartphone and the laptop computer is established, the smartphone can detect the parameter information characterizing that the smartphone is currently connected to the laptop computer. The communication connection established between the electronic device and the source device may be a wired communication connection or a wireless communication connection.

At 202, in response to the electronic device being in a sharing scenario, based on the parameter information, a sharing identifier for sharing the source device is displayed.

In an example embodiment, in response to the smartphone being currently in a sharing scenario, the smartphone displays a sharing identifier for sharing the display data of the source device.

In some embodiments, in some application scenarios, in response to the electronic device being in a sharing scenario, the electronic device establishes a communication connection with the source device, and the electronic device generates a sharing identifier based on the parameter information, and displays the sharing identifier. The execution sequence between process 201 an process 202 can be determined according to an actual situation, which is not limited here.

At 203, in response to obtaining an input operation for the sharing identifier, display data of the source device obtained through a first connection channel is sent to a server of the sharing scenario based on a second connection channel.

In response to the input operation for the sharing identifier being obtained, the display data of the source device obtained through the first connection channel is sent to the server of the sharing scenario based on the second connection channel, to achieve real-time sharing of the display data of the source device by at least one sharing object in the sharing scenario. The display data of the source device includes dynamically changing data generated by the source device for display. The at least one sharing object may include one or more devices used by another one or more users in the sharing scenario, or one or more devices used by another one or more users in a multi-party remote conference.

In some embodiments, in response to the user touching the sharing identifier displayed on the smartphone to confirm to share the display data of the source device to the server, the smartphone obtains the input operation and responds to the input operation. The smartphone sends the obtained display data of the source device to the determined server through the second connection channel.

In some embodiments, the parameter information includes at least one of setting information indicating that a display screen of the electronic device is set as a projection screen, where in response to the source device being successfully connected through the first connection channel, the display data is displayed on the display screen, or operating information indicating that a screen-casting application is running, where in response to the source device being successfully connected through the first connection channel, the display data is displayed on the display screen through the screen-casting application.

In some embodiments, a communication connection between the electronic device and the source device may be established in a manner of screen projection. The screen projection between the electronic device and the source device may be implemented by setting the display screen of the electronic device as a projection screen. In some embodiments, the screen projection between the electronic device and the source device may be implemented by using a screen projection application.

In some embodiments, displaying, based on the parameter information, a sharing identifier for sharing the source device may include the following processes.

At 202a, a virtual display screen is created.

The virtual display screen is used to display the display data of the source device.

In an example embodiment, after the electronic device receives the display data of the source device, the electronic device can create a virtual display screen for displaying the display data of the source device according to pixel requirements of the display data of the source device.

At 202b, the sharing identifier of the virtual display screen is added and displayed based on the virtual display screen.

In an example embodiment, display is performed on the virtual display screen, and the sharing identifier is added to the virtual display screen. The sharing identifier is used to enable the user to perform the sharing operation on the displayed data on the virtual display screen.

As shown in FIG. 2, the information processing method further includes the following processes.

At 204, the display data of the source device is displayed in a first display area of the display screen.

In an example embodiment, the display data of the source device is displayed in the first display area of the display screen of the electronic device.

At 205, an input operation for the display data is obtained.

In an example embodiment, the electronic device detects an input operation performed by the user on the display data displayed on the display screen. For example, the input operation may include a page scrolling, a page turning, etc.

At 206, input data of the input operation is sent to the source device through the first connection channel.

The input data of the input operation is sent to the source device through the first connection channel, to cause the source device to change the display data of the source device in response to the input operation based on the input data.

In some embodiments, the electronic device sends the detected input data of the input operation to the source device through the first connection channel to realize a control operation of the display data of the source device by the electronic device. In some embodiments, if process 203 exists, processes 204 to 206 can be executed after process 203 or before process 203. In some application scenarios, if no input operation for the sharing identifier is detected, after the electronic device executes the process 202, only processes 204 to 206 are performed. Correspondingly, process 203 is not performed.

In some embodiments, the information processing method further includes determining whether the electronic device is in the sharing scenario. In some embodiments, determining whether the electronic device is in the sharing scenario displaying may include the following processes.

At 202c, a sharing instruction is detected during a communication process within a target group of a communication application.

The sharing instruction is used for displaying a shared screen or a shared file.

In an example embodiment, when the electronic device implements communication within the target group through the communication application, the electronic device detects whether there is a sharing instruction.

At 202d, in response to detecting the sharing instruction, the electronic device is determined to be in the sharing scenario.

In an example embodiment, in response to the electronic device detecting the sharing instruction, it is determined that the electronic device is in the sharing scenario.

Taking the electronic device is a smartphone and the source device is a computer as an example, when a user starts a video conference, a voice conference, a video chat, or a voice chat through the smartphone, or when a user perform a live broadcasting through the smartphone, in response to the smartphone being connected to the computer for communication, a display screen of the smartphone displays a sharing button for sharing the display data of the computer, to enable the user to perform an operation on the sharing button to realize a sharing of the display data of the computer to other devices in the video conference, the voice conference, the video chat, or the voice chat with the smartphone. Therefore, other users can also view the display data of the computer. The other devices may be some or all of the devices participating the video conference, the voice conference, the video chat, or the voice chat with the smartphone. During the process of the live broadcasting by the smartphone, the smartphone can share the display data of the computer to the server that provides the live broadcasting service, to enable one or more users who watches the live broadcasting can obtain the display data of the computer from the server. During this process, the display screen of the smartphone can be controlled to be turned off after a certain period of time or after receiving a user control command, but a microphone and a camera of the smartphone can continue to work according to an actual application scenario. In an example application scenario, when the display screen of the smartphone displays the received display data of the computer, in response to detecting an operation by the user on the displayed data of the computer, for example, marking or turning pages, the operation can also be sent to the computer to realize synchronous operation on the display data on the computer. In some embodiments, the operation can also be synchronously sent to other devices for displaying the synchronous operation.

In some embodiments, when the smartphone obtains the display data of the computer, the smartphone may send a request to the computer to obtain the display data of the computer. In some embodiments, after the communication connection between the smartphone and the computer is established, the computer may actively send the display data of the computer to the smartphone. The display data of the computer includes display content of an application program running on the computer, for example, the content currently displayed on the computer is content of an office file corresponding to an office application program.

Figure 3:
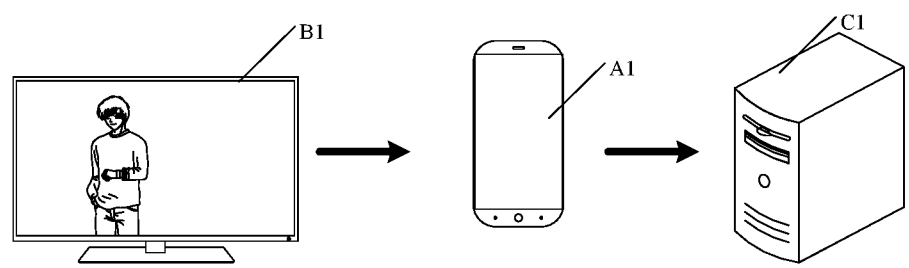
FIG. 3 is a schematic diagram showing an application scenario consistent with the embodiments of the disclosure.

FIG. 3 is a schematic diagram showing an application scenario consistent with the embodiments of the disclosure. In the application scenario, the electronic device is a smartphone A1, the source device is a computer B1, and the server is a server C1. The smartphone A1 receives display data of the computer B1 during a live broadcasting process. After a sharing button is generated and a user touches the sharing button, the display data of the computer B1 is shared to the server C1 that provides live broadcasting service, so that the server C1 can send the display data of the computer B1 to another terminal device watching the live broadcasting.

Taking the electronic device is a computer and the source device is a smartphone as an example, when a user starts a video conference, a voice conference, a video chat, or a voice chat through the computer, or when a user perform a live broadcasting through the computer, in response to the computer being connected to the smartphone for communication, a display screen of the computer displays a sharing button for sharing the display data of the smartphone, to enable the user to perform an operation on the sharing button to realize a sharing of the display data of the smartphone to other devices in the video conference, the voice conference, the video chat, or the voice chat with the computer. Therefore, other users can also view the display data of the smartphone. The other devices may be some or all of the devices participating the video conference, the voice conference, the video chat, or the voice chat with the computer. During the process of the live broadcasting by the computer, the computer can share the display data of the smartphone to the server that provides the live broadcasting service, to enable one or more users who watches the live broadcasting can obtain the display data of the smartphone from the server. During this process, the display screen of the computer can be controlled to be turned off after a certain period of time or after receiving a user control command, but a microphone and a camera of the computer can continue to work according to an actual application scenario. In an example application scenario, when the display screen of the computer displays the received display data of the smartphone, in response to detecting an operation by the user on the displayed data of the smartphone, for example, marking or turning pages, the operation can also be sent to the smartphone to realize synchronous operation on the display data on the smartphone. In some embodiments, the operation can also be synchronously sent to other devices for displaying the synchronous operation.

In some embodiments, when the computer obtains the display data of the smartphone, the computer may send a request to the smartphone to obtain the display data of the smartphone. In some embodiments, after the communication connection between the smartphone and the computer is established, the smartphone may actively send the display data of the smartphone to the computer. The display data of the smartphone includes display content of an application program running on the smartphone. For example, when the user plays a game on the smartphone, the content currently displayed on the smartphone is content of a current game interface.

In some embodiments, the communication connection between the smartphone and the computer may be realized by a screen projection application. If the electronic device is a computer and the source device is also a computer, a wireless screen projection function of the computer can be implemented between the electronic device and the source device.

Figure 4:
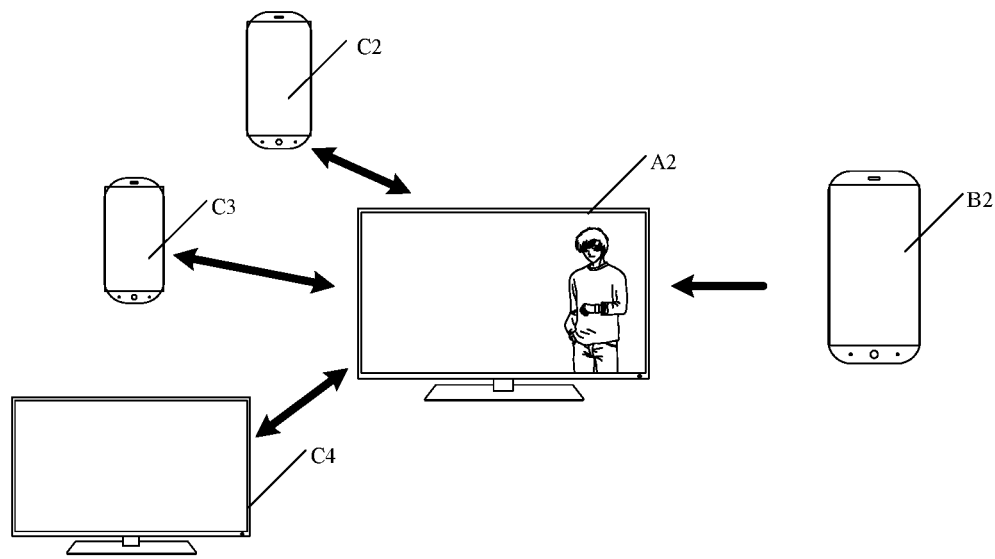
FIG. 4 is a schematic diagram showing another application scenario consistent with the embodiments of the disclosure.

FIG. 4 is a schematic diagram showing another application scenario consistent with the embodiments of the disclosure. The electronic device is a computer A2, the source device is a smartphone B2, and the server includes terminal devices C2, C3, and C4 that conduct a remote video conference with the computer A2. During the video conference between the computer A2 and the terminal devices C2, C3, and C4, after the computer A2 receives the display data of the smartphone B2, a sharing button is generated. After the user performs a touch operation on the sharing button, such as a selection operation, the display data of the smartphone B2 is shared to the terminal devices C2, C3, and C4, so that the terminal devices C2, C3, and C4 can view the display data of smartphone B2, thereby improving meeting efficiency during the remote conference. In some embodiments, the display data of the smartphone B2 is only shared to one or more selected terminal devices, for example, only to the terminal device C2.

The information processing method consistent with the embodiments of the present disclosure is provided. The parameter information is obtained. In response to an electronic device being in a sharing scenario, based on the parameter information, a sharing identifier for sharing the source device is displayed. In response to obtaining an input operation for the sharing identifier, display data of the source device obtained through a first connection channel is sent to a server of the sharing scenario based on a second connection channel. In this way, when the parameter information configured to characterize a connected source device is obtained, if the electronic device is in the sharing scenario, the sharing identifier used for the sharing source device is displayed based on the parameter information. The display data of the source device obtained through the first connection channel is sent to the server of the sharing scenario based on the second connection channel, to realize the sharing of the display data sent by the source device to the server of the sharing scenario, which solves the problem that when the current electronic device shares the content of the third-party device during the call, the sharing operation process is relatively complicated and the quality of the shared content is poor. The information processing method consistent with the embodiments of the present disclosure is a method for sharing the content of a third-party device during a call, which simplifies the sharing operation process and effectively ensures the quality of the shared content.

For simple description, the above embodiments are all expressed as a combination of a series of actions, but those skilled in the art should know that the present disclosure is not limited by the described sequence of actions. For example, some processes in the above embodiments can be performed in another order or at a same time. Further, those skilled in the art should also know that the actions and members in the embodiments described herein are not necessarily required by the present disclosure.

The method consistent with the above embodiments of the present disclosure is described in detail, which can be implemented by various forms of devices. Therefore, a device consistent with the present disclosure is also disclosed. Specific embodiments are given below for detailed description.

Figure 5:
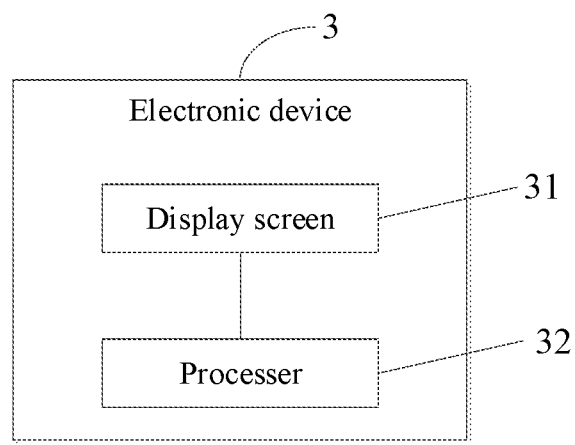
FIG. 5 is a schematic structural diagram of an electronic device consistent with the embodiments of the disclosure.

FIG. 5 is a schematic structural diagram of an electronic device 3 consistent with the embodiments of the disclosure. As shown in FIG. 5, the electronic device 3 includes a display screen 31 and a processor 32.

The processor 32 is configured to obtain parameter information. The parameter information is configured to characterize a connected source device, and the source device is capable of processing and displaying information. The processor 32 is further configured to, in response to the electronic device being in a sharing scenario, control the display screen to display, based on the parameter information, a sharing identifier for sharing the source device, and in response to obtaining an input operation for the sharing identifier, send display data of the source device obtained through a first connection channel to a server of the sharing scenario based on a second connection channel, to achieve real-time sharing of the display data of the source device by at least one sharing object in the sharing scenario. The display data of the source device includes dynamically changing data generated by the source device for display.

In some embodiments, the parameter information includes at least one of setting information indicating that a display screen of the electronic device is set as a projection screen, where in response to the source device being successfully connected through the first connection channel, the display data is displayed on the display screen, or operating information indicating that a screen-casting application is running, where in response to the source device being successfully connected through the first connection channel, the display data is displayed on the display screen through the screen-casting application.

In some embodiments, the processor is further configured to create a virtual display screen for displaying the display data, and add and display, based on the virtual display screen, the sharing identifier of the virtual display screen.

In some embodiments, the processor is further configured to display the display data in a first display area of the display screen, obtain an input operation for the display data, and send input data of the input operation to the source device through the first connection channel, to cause the source device to, in response to the input operation, change the display data based on the input data.

In some embodiments, the processor is further configured to determine whether the electronic device is in the sharing scenario, including detecting a sharing instruction during a communication process within a target group of a communication application, and in response to detecting the sharing instruction, determining that the electronic device is in the sharing scenario. The sharing instruction is used for displaying a shared screen or a shared file.

For the specific implementation process of the steps executed by the processor in an example embodiment, reference may be made to the implementation process in the information processing method consistent with the embodiments of FIGS. 1 and 2, which are not repeated here.

The electronic device consistent with the embodiments of the present disclosure is provided. The parameter information is obtained. In response to an electronic device being in a sharing scenario, based on the parameter information, a sharing identifier for sharing the source device is displayed. In response to obtaining an input operation for the sharing identifier, display data of the source device obtained through a first connection channel is sent to a server of the sharing scenario based on a second connection channel. In this way, when the parameter information configured to characterize a connected source device is obtained, if the electronic device is in the sharing scenario, the sharing identifier used for the sharing source device is displayed based on the parameter information. The display data of the source device obtained through the first connection channel is sent to the server of the sharing scenario based on the second connection channel, to realize the sharing of the display data sent by the source device to the server of the sharing scenario, which solves the problem that when the current electronic device shares the content of the third-party device during the call, the sharing operation process is relatively complicated and the quality of the shared content is poor. The information processing method consistent with the embodiments of the present disclosure is a method for sharing the content of a third-party device during a call, which simplifies the sharing operation process and effectively ensures the quality of the shared content.

A non-transitory computer-readable storage medium consistent with the embodiments of the present disclosure is provided. The non-transitory computer-readable storage medium storing computer instructions that, when executed by a processor, causing the processor to perform the information processing method consistent with the embodiments of FIGS. 1 and 2, which are not repeated here.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. An information processing method comprising:
   obtaining, by an electronic device, parameter information, the parameter information being configured to characterize a connected source device, and the source device being capable of processing and displaying information;
   in response to the electronic device being in a sharing scenario, displaying, on the electronic device based on the parameter information, a sharing identifier for sharing the source device; and
   in response to obtaining an input operation for the sharing identifier:
      obtaining display data of the source device through a first connection channel between the electronic device and the source device; and
      sending the display data of the source device to a server of the sharing scenario based on a second connection channel between the electronic device and the server, to cause the server to share the display data of the source device with at least one sharing object in the sharing scenario in real time, to cause the at least one sharing object to display the display data on a screen of the at least one sharing object, the at least one sharing object being a device other than the electronic device and the source device, and the electronic device being connected between the source device and the server;
   wherein the display data of the source device includes dynamically changing data generated by the source device for display.

2. The method of claim 1, wherein the parameter information includes at least one of:
   setting information indicating that a display screen of the electronic device is set as a projection screen, wherein in response to the source device being successfully connected through the first connection channel, the display data is displayed on the display screen; or
   operating information indicating that a screen-casting application is running, wherein in response to the source device being successfully connected through the first connection channel, the display data is displayed on the display screen through the screen-casting application.

3. The method of claim 2, wherein displaying, based on the parameter information, the sharing identifier for sharing the source device includes:
   creating a virtual display screen for displaying the display data; and
   adding and displaying, based on the virtual display screen, the sharing identifier of the virtual display screen.

4. The method of claim 2, further comprising:
   displaying the display data in a first display area of the display screen;
   obtaining an input operation for the display data; and
   sending input data of the input operation to the source device through the first connection channel, to cause the source device to, in response to the input operation, change the display data based on the input data.

5. The method of claim 1, further comprising:
   determining whether the electronic device is in the sharing scenario, including:
      detecting a sharing instruction during a communication process within a target group of a communication application, the sharing instruction being used for displaying a shared screen or a shared file; and
      in response to detecting the sharing instruction, determining that the electronic device is in the sharing scenario.

6. The method of claim 1, wherein:
   the electronic device includes a smartphone; and
   the source device includes a computer device.

7. The method of claim 1, wherein displaying, based on the parameter information, the sharing identifier for sharing the source device includes:
   creating a virtual display screen for displaying the display data; and
   adding and displaying, based on the virtual display screen, the sharing identifier of the virtual display screen.

8. An electronic device comprising:
   a display screen; and
   a processor configured to:
      control the electronic device to obtain parameter information, the parameter information being configured to characterize a connected source device, and the source device being capable of processing and displaying information;
      in response to the electronic device being in a sharing scenario, control the display screen to display, based on the parameter information, a sharing identifier for sharing the source device; and
      in response to obtaining an input operation for the sharing identifier;
         obtain display data of the source device through a first connection channel between the electronic device and the source device; and
         sending the display data of the source device to a server of the sharing scenario based on a second connection channel between the electronic device and the server, to cause the server to share the display data of the source device with at least one sharing object in the sharing scenario in real time, to cause the at least one sharing object to display the display data on a screen of the at least one sharing object, the at least one sharing object being a device other than the electronic device and the source device, and the electronic device being connected between the source device and the server;
      wherein the display data of the source device includes dynamically changing data generated by the source device for display.

9. The electronic device of claim 8, wherein the parameter information includes at least one of:
   setting information indicating that a display screen of the electronic device is set as a projection screen, wherein in response to the source device being successfully connected through the first connection channel, the display data is displayed on the display screen; or
   operating information indicating that a screen-casting application is running, wherein in response to the source device being successfully connected through the first connection channel, the display data is displayed on the display screen through the screen-casting application.

10. The electronic device of claim 9, wherein the processor is further configured to:
    create a virtual display screen for displaying the display data; and
    add and display, based on the virtual display screen, the sharing identifier of the virtual display screen.

11. The electronic device of claim 9, wherein the processor is further configured to:
  display the display data in a first display area of the display screen;
  obtain an input operation for the display data; and
  send input data of the input operation to the source device through the first connection channel, to cause the source device to, in response to the input operation, change the display data based on the input data.

12. The electronic device of claim 8, wherein the processor is further configured to:
  determine whether the electronic device is in the sharing scenario, including:
    detecting a sharing instruction during a communication process within a target group of a communication application, the sharing instruction being used for displaying a shared screen or a shared file; and
    in response to detecting the sharing instruction, determining that the electronic device is in the sharing scenario.

13. The electronic device of claim 8, wherein:
  the electronic device includes a smartphone; and
  the source device includes a computer device.

14. A non-transitory computer-readable storage medium storing computer instructions that, when executed by a processor, causing the processor to perform the method of claim 1.

15. The non-transitory computer-readable storage medium of claim 14, wherein the parameter information includes at least one of:
  setting information indicating that a display screen of the electronic device is set as a projection screen, wherein in response to the source device being successfully connected through the first connection channel, the display data is displayed on the display screen; or
  operating information indicating that a screen-casting application is running, wherein in response to the source device being successfully connected through the first connection channel, the display data is displayed on the display screen through the screen-casting application.

16. The non-transitory computer-readable storage medium of claim 15, wherein displaying, based on the parameter information, the sharing identifier for sharing the source device includes:
  creating a virtual display screen for displaying the display data; and
  adding and displaying, based on the virtual display screen, the sharing identifier of the virtual display screen.

17. The non-transitory computer-readable storage medium of claim 15, wherein the computer instructions that, when executed by a processor, further cause the processor to perform:
  displaying the display data in a first display area of the display screen;
  obtaining an input operation for the display data; and
  sending input data of the input operation to the source device through the first connection channel, to cause the source device to, in response to the input operation, change the display data based on the input data.

18. The non-transitory computer-readable storage medium of claim 14, wherein the computer instructions that, when executed by a processor, further cause the processor to perform:
  determining whether the electronic device is in the sharing scenario, including:
    detecting a sharing instruction during a communication process within a target group of a communication application, the sharing instruction being used for displaying a shared screen or a shared file; and
    in response to detecting the sharing instruction, determining that the electronic device is in the sharing scenario.

19. An information processing method comprising:
  obtaining parameter information, the parameter information being configured to characterize a connected source device, and the source device being capable of processing and displaying information;
  in response to an electronic device being in a sharing scenario, displaying, based on the parameter information, a sharing identifier for sharing the source device, including:
    creating a virtual display screen for displaying the display data; and
    adding and displaying, based on the virtual display screen, the sharing identifier of the virtual display screen; and
  in response to obtaining an input operation for the sharing identifier, sending display data of the source device obtained through a first connection channel to a server of the sharing scenario based on a second connection channel, to achieve real-time sharing of the display data of the source device by at least one sharing object in the sharing scenario;
  wherein the display data of the source device includes dynamically changing data generated by the source device for display.

* * * * *